US008767083B2

(12) United States Patent
Siulinski

(10) Patent No.: US 8,767,083 B2
(45) Date of Patent: Jul. 1, 2014

(54) REMOTE DISPLAY GLASSES CAMERA SYSTEM AND METHOD

(75) Inventor: James A Siulinski, Westbrook, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 399 days.

(21) Appl. No.: 13/109,485

(22) Filed: May 17, 2011

(65) Prior Publication Data

US 2012/0293702 A1 Nov. 22, 2012

(51) Int. Cl.
*H04N 5/228* (2006.01)

(52) U.S. Cl.
USPC ............. 348/222.1; 348/333.01; 348/333.09; 348/373

(58) Field of Classification Search
USPC ............. 348/222.1, 333.01–333.09, 373, 374
See application file for complete search history.

(56) References Cited

U.S. PATENT DOCUMENTS

| 5,828,986 A * | 10/1998 | Horigome et al. ............ 702/126 |
| 6,141,036 A * | 10/2000 | Katayama et al. ............ 348/47 |
| 2011/0135290 A1* | 6/2011 | Lee et al. ........................ 396/58 |

OTHER PUBLICATIONS

Sorre, "DSLR Camera Remote HD for iPad," dated Nov. 1, 2010, available at http://www.wired.com/gadgetlab/2010/11/dslr-camera-remote-hd-for-ipad/, retrieved on Jun. 7, 2011.
Breeze Systems, "DSLR Remote Pro for Mac," available at http://www.breezesys.com/DSLRRemotePro4Mac/index.htm, retrieved on Jun. 7, 2011.
Electron Lifer, "Pro-View to the frame and shooting with digital SLR cameras remotely and wirelessly up to 500 Feet," posted Sep. 6, 2010, available at http://electronlifer.info/pro-view-to-the-frame-and-shooting-with-digital-slr-cameras-remotely-and-wirelessly-up-to-500-feet/, retrieved on Jun. 7, 2011.

* cited by examiner

*Primary Examiner* — Yogesh Aggarwal
(74) *Attorney, Agent, or Firm* — Grossman Tucker Perreault & Pfleger PLLC

(57) ABSTRACT

A system including a digital camera and remote display glasses. The remote display glasses include a frame, at least one display, and a first and a second temple configured to support the display proximate to at least one of the user's eyes when the remote display glasses are worn on the user's head. The digital camera includes a lens configured to capture light, an electronic viewfinder; a video processor configured to generate an image, and a camera switch configured to selectively transmit the image from the video processor to the electronic viewfinder or the display of the remote display glasses.

16 Claims, 3 Drawing Sheets

REMOTE DISPLAY GLASSES CAMERA SYSTEM AND METHOD

FIELD

The present disclosure relates to a camera system, and more particularly, to remote display glasses for use with a camera.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
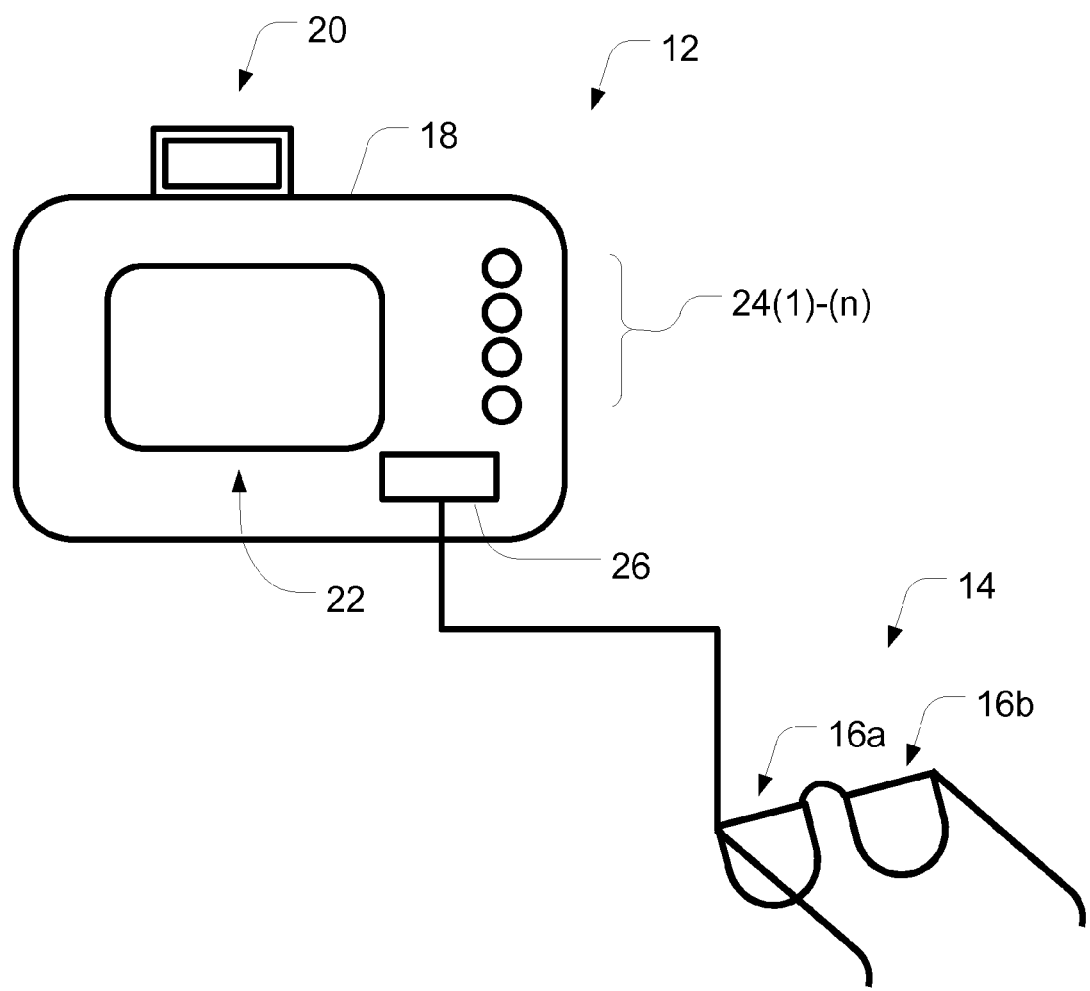
FIG. 1 illustrates a remote display camera system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides a system and method for remotely displaying an image captured by a camera. In one embodiment, images (e.g., a video image) captured by a camera (such as, but not limited to, a digital single-lens reflex (DSLR) camera) are sent to remote display glasses which may be worn by a user of the camera control (i.e., the "photographer"). The photographer may selectively view the image(s) captured by the camera through one or more of the camera's optical viewfinder, the camera's video display (e.g., a liquid crystal display (LCD) or the like forming part of the camera), and/or the remote glasses.

Digital cameras often have both an optical viewfinder and a larger electronic viewfinder, both of which are integrated into the camera. The optical viewfinder is a small display sized for one of the photographer's eyes. Depending on the design of the camera, the optical viewfinder may permit the photographer to see exactly what will be captured by the camera. The larger electronic viewfinder includes a display mounted to the camera such that the photographer can view the image with both eyes. The photographer may view images stored on the camera using the electronic viewfinder. Additionally, when using a "Live View" mode, much of the information that is typically displayed in the optical viewfinder may be displayed in the electronic viewfinder. Unfortunately, the electronic viewfinder suffers from several disadvantages. For example, the electronic viewfinder is typically inadequate for determining many properties/settings (e.g., but not limited to, proper focus, exposure, composition, etc.). Another disadvantage of the electronic viewfinder is that ambient lighting conditions may cause the electronic viewfinder to be difficult (or impossible) to view. While ambient light sensors may adjust the brightness of the electronic viewfinder, it is not always possible to properly adjust the brightness of the electronic viewfinder in certain lighting conditions.

Another disadvantage of the electronic viewfinder is that it consumes a lot of power. While an electronic viewfinder having a larger display may be easier to see compared to an electronic viewfinder having a smaller sized display, the larger display generally consumes more power. As a result, battery life may be significantly reduced when using the electronic viewfinder. Yet another disadvantage of the electronic viewfinder is that it may be difficult to view in some applications. For example, in some photography situations (e.g., when a photographer is taking shots above his head or along the ground), the electronic viewfinder may be at an angle which cannot be seen. While it is possible to mount the electronic viewfinder on a hinge or the like, the hinge adds additional weight and bulk to the camera. Additionally, the photographer may still need to move the display, which may be difficult in many applications.

Turning now to FIG. 1, a remote display camera system 10 consistent with one embodiment of the present disclosure is generally illustrated. The remote display camera system 10 includes a camera 12 and remote display glasses 14. The remote display camera system 10 is configured to allow a photographer to selectively display images captured by and/or stored on the camera 12 on one or more displays 16a, 16b associated with the remote display glasses 14 as described herein.

The camera 12 may include any digital camera including, but not limited to, DSLR, non-SLR digital cameras (e.g., but not limited to, compact digicams and SLR-like bridge digital cameras (also known as advanced digital cameras), and SLR-like interchangeable lens digital cameras), as well as video recorders (e.g., but not limited to, camcorders or the like). The camera 12 includes a body 18 and one or more lenses (not shown for clarity). The camera 12 may also include an optical viewfinder 20 and/or an electronic viewfinder 22. The optical viewfinder 20 may show an image generally corresponding to the light coming through the camera lens. The optical viewfinder 20 may also show additional information, for example, corresponding to various settings (focus, exposure, lighting, number of remaining images, etc.).

The electronic viewfinder 22 includes a display (e.g., but not limited to, a LCD display or the like) for displaying an image. Optionally, the electronic viewfinder 22 may be hingedly and/or pivotally coupled to the camera body 18; thereby allowing the electronic viewfinder 22 to be seen from different angles relative to the camera body 18. The electronic viewfinder 22 may be used to display and/or select various functions related to the operation of the camera. For example, the electronic viewfinder 22 may be used to display and/or select camera settings, tools, folders, and/or images stored on memory associated with the camera (not shown for clarity). The camera 12 may also include one or more buttons or the like 24(1)-(n) for selecting various features and/or functions. For example, using the buttons 22(1)-(n), the photographer may adjust the exposure, focus, zoom, composition, etc. The photographer may also select a "Live View" mode (also known as "Live Preview") using one or more buttons 24(1)-(n). During the "Live View" mode, the electronic viewfinder 22 may display an image generally corresponding to the light coming through the camera lens.

Figure 2:
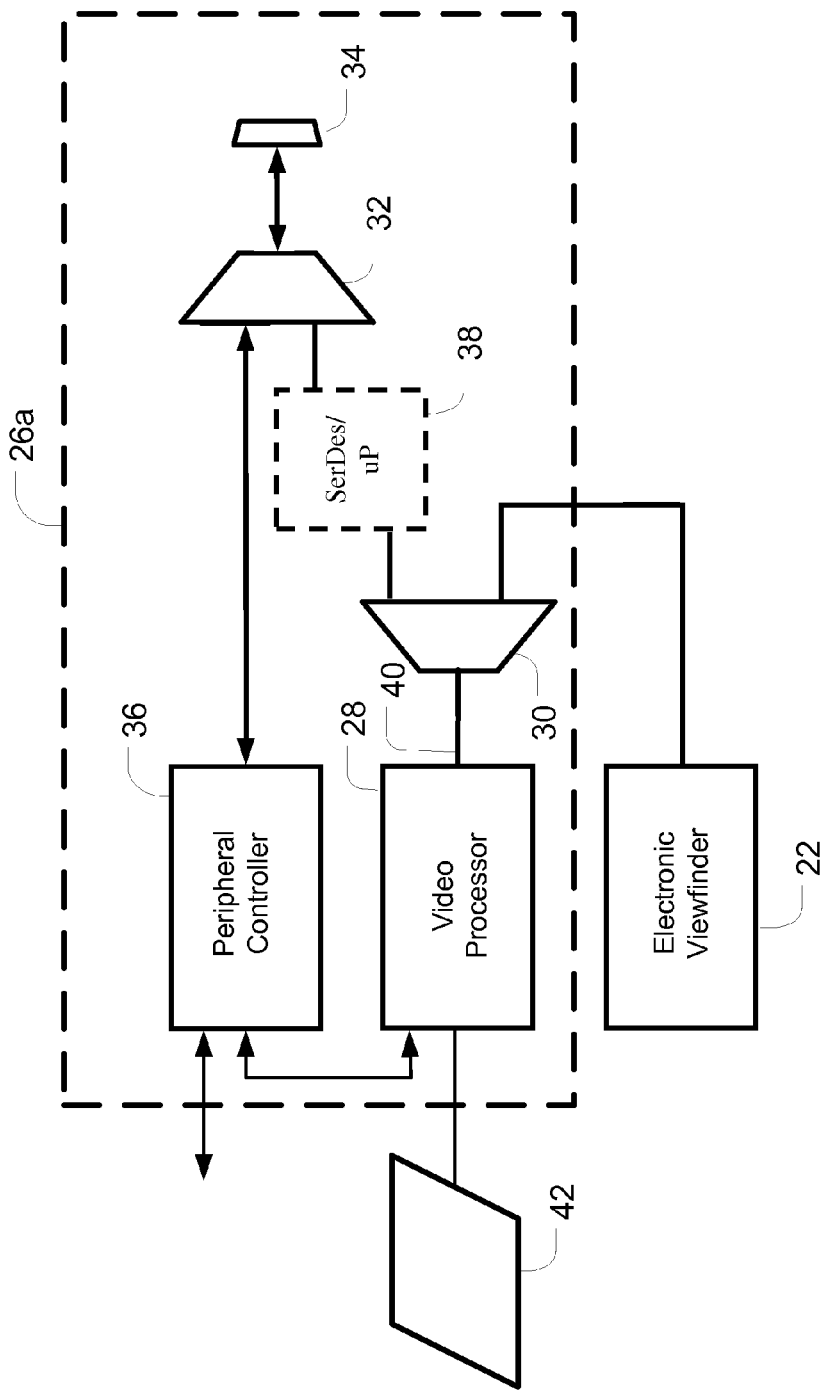
FIG. 2 illustrates one embodiment of a video circuitry consistent with the present disclosure.

Consistent with the present disclosure, the camera 12 also includes video circuitry 26 configured to allow the photographer to selectively display images (captured by and/or stored on the camera 12) on the electronic viewfinder 22 and/or one or more displays 16a, 16b associated with the remote display glasses 14. One embodiment of the video circuitry 26 consistent with the present disclosure is generally illustrated in FIG. 2. In particular, the video circuitry 26a may include a video display processor 28, a camera switch 30, a peripheral switch 32, a peripheral connector 34, and a peripheral interface controller 36. As explained herein, the video circuitry 26a may optionally include a serializer/deserializer 38.

The video processor 28 is configured to generate a signal 40 representing one or more images (e.g., image(s) stored in a frame buffer, hereinafter referred to as "image 40") intended for output to a display. For example, the video processor 28 may generate an image 40 based on a signal 42 from the camera's primary optical sensor, a secondary optical sensor (which may avoid additional noise that might result from the primary sensor heating up from continuous use during Live View mode and allow faster auto-focus), and/or from memory associated with the camera.

The camera switch 30 is configured to allow the photographer to selectively transmit the image 40 generated by the video processor 28 to either the electronic viewfinder 22 and/or the peripheral connector 34 (e.g., by way of the serializer/deserializer 38 and/or the peripheral switch 32) and ultimately to the remote display glasses 14 (not shown in FIG. 2). The camera switch 30 is configured to receive the images 40 generated by the video processor 28 and to selectively transfer the image 40 to either the electronic viewfinder 22 (where the image 40 may be viewed by the photographer) and/or the peripheral connector 36 for transmission to a peripheral device (such as, but not limited to, the remote display glasses 14). According to one embodiment, the camera switch 30 includes a multiplexer (MUX) such as, but not limited to, a FSA641 or FSA1211 switch, both of which are commercially available from Fairchild Semiconductor (the assignee of the present disclosure).

The peripheral switch 32 is configured to selectively allow data to be transmitted between the peripheral connector 34 and either the video processor 28 (e.g., the images 40) or the peripheral controller 36. For example, the peripheral switch 32 may include Universal Serial Bus (USB) switch such as, but not limited to, a FSUSB42 switch which is commercially available from Fairchild Semiconductor. The peripheral switch 32 may be configured to selectively transmit the images 40 generated by the video processor 28 to the peripheral connector 34 (which may include a USB connector 34), and ultimately to the remote display glasses 14. The peripheral switch 32 may also be configured to selectively allow signals to be transmitted between the peripheral controller 36 and the peripheral connector 34 as described herein. The peripheral controller 34 is configured to establish communication between the remote display glasses and the video processor 28, as well as other circuitry (such as, but not limited to, image processing circuitry, memory, etc.) associated with the camera 12 (not shown for clarity). According to one embodiment, the peripheral controller 34 may include a USB controller.

Depending on the video processor 28 and/or the peripheral connector 34, the video circuitry 26a may include a serializer/deserializer 38. For example, if the output of the video processor 28 is a parallel interface and the peripheral connector 34 is a USB connector, then the video circuitry 26a may include the serializer/deserializer 38 configured to convert data between serial data and parallel interfaces in each direction. According to one embodiment, the serializer/deserializer 38 may include a MicroSerDes serializer/deserializer which is commercially available from Fairchild Semiconductor.

The video circuitry 26a is therefore configured to allow the photographer to selectively send images 40 generated by the camera 12 (e.g., the video processor 28) to the electronic viewfinder 22 and/or an external peripheral device (such as the remote display glasses 14). As described further herein, the video circuitry 26a may also be configured to allow the photographer to control various functions of the camera 12. For example, the peripheral connector 34 may be configured to receive command signals from the remote display glasses 14, and to transmit the command signals to the peripheral controller 36. The peripheral controller 36 may be configured to establish communication with the video processor 28 and/or other circuitry (such as, but not limited to, image processing circuitry, memory, etc.) associated with the camera 12.

It should be understood, however, that the above description is merely one embodiment of the video circuitry 26a, and that alternatives are also possible. For example, while the video circuitry 26a may be configured to communicate with the remote display glasses 14 using a cable coupled to the peripheral connector 34 (e.g., but not limited to, a USB cable), the video circuitry 26a may also be configured to communicate with the remote display glasses 14 using other communication protocols including, but not limited, wireless communication. Examples of wireless communication include short range communication such as, but not limited to, near field communication (NFC), Bluetooth, ultra-wideband (UWB), and the like. The camera 12 (e.g., the video circuitry 26a) may therefore include a wireless transceiver. The wireless transceiver may be removably connected to the peripheral connector 34. Alternatively, the wireless transceiver may be integrated into the circuitry of the camera 12. For example, the wireless transceiver may be integrated into the video circuitry 26a (e.g., but not limited to, the peripheral controller 36).

Figure 3:
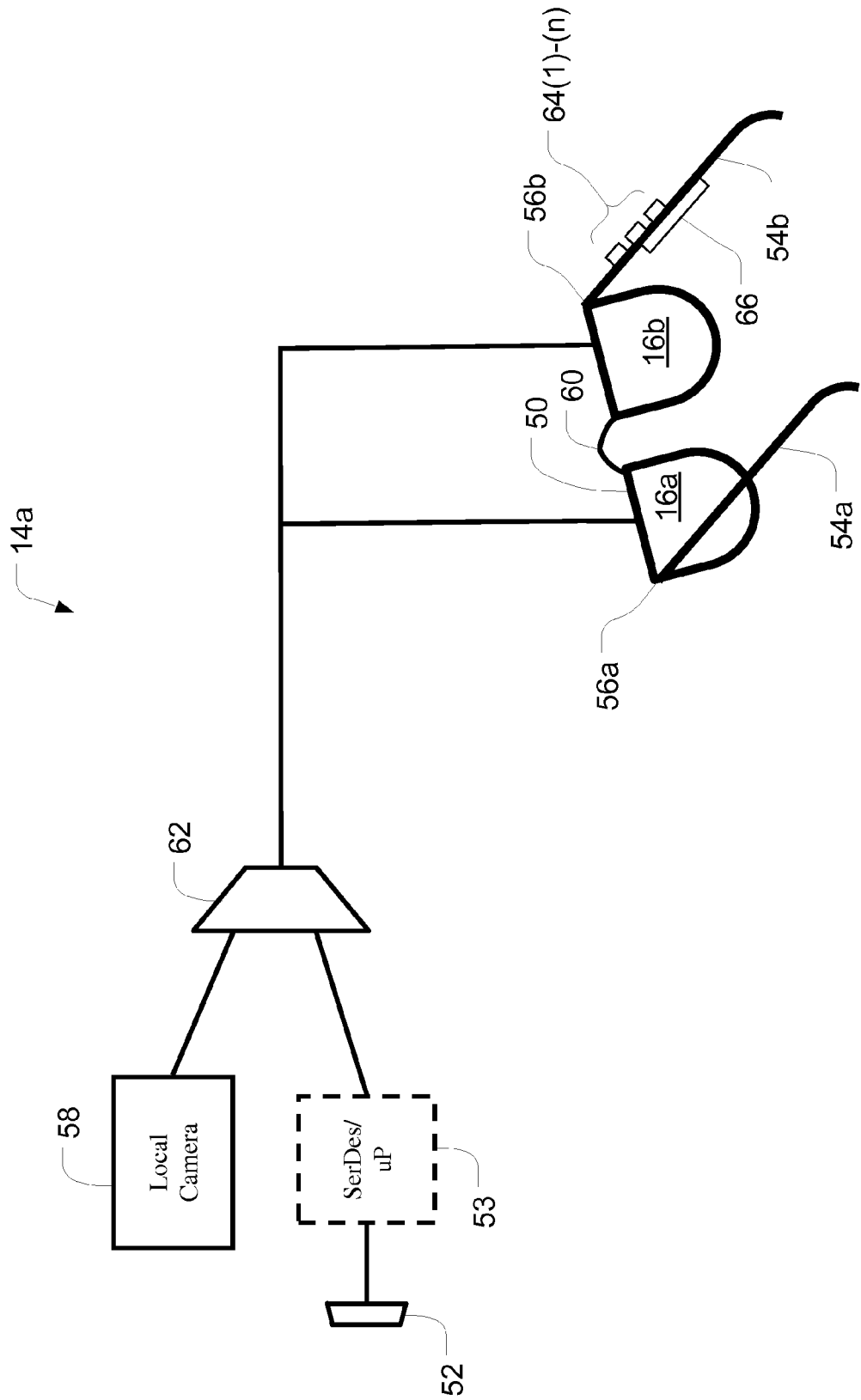
FIG. 3 illustrates one embodiment of a pair of remote display glasses consistent with the present disclosure.

Turning now to FIG. 3, one embodiment of the remote display glasses 14a is generally illustrated. The remote display glasses 14a are configured to receive the image 40 from the video circuitry 26, and display the image 40 in at least one display 16a, 16b. When the camera 12 is operated in a "Live View" mode, the photographer may therefore see an image 40 in the display 16a, 16b of the remote display glasses 14a which generally corresponds to the image to be captured by the camera 12.

According to one embodiment, the remote display glasses 14a includes an eyeglass frame 50, at least one display 16a, 16b, and a peripheral connector 52. The eyeglass frame 50 includes a first and a second temple 54a, 54b configured to support the displays 16a, 16b proximate to the user's eye when the remote display glasses 14a are worn on the user's head. The temples 54a, 54b may be connected to a portion of the frame 50 via one or more hinges 56a, 56b or the like.

The peripheral connector 52 is configured to allow the remote display glasses 14a to establish communication with the video circuitry 26 (e.g., via the peripheral connector 34 of the video circuitry 26). According to one embodiment, the peripheral connector 56 includes a USB connector which may be coupled to the USB connector 34 of the video circuitry 26, for example, by way of a cable or the like (not shown in FIG. 3, but shown in FIG. 1). The camera 12 and the remote display glasses 14a may communicate using a serial data protocol such as, but not limited to, the Mobile High definition Link (MHL), the Mobile Industry Processor Interface (MIPI) D-Phy with SerDes or M-Phy for serial. However, it should be understood that other communication devices and/or protocols may be used to transmit data between the remote display glasses 14a and the video circuitry 26 of the camera 12.

Optionally, the remote display glasses 14a may include a serializer/deserializer 53 depending on type data received at the peripheral connector 52 from the video circuitry 26 of the camera 12. For example, if the video circuitry 26 of the camera 12 includes a serial data stream (e.g., the peripheral connector 34 is a USB connector), then the remote display glasses 14a may include the serializer/deserializer 62 configured to convert data between serial data and parallel interfaces. According to one embodiment, the serializer/deserializer 38 may include a MicroSerDes serializer/deserializer which is commercially available from Fairchild Semiconductor.

As discussed herein, the remote display glasses 14a may include one or more displays 16a, 16b configured to display an image 40 received at the peripheral connector 52 from the video circuitry 26 of the camera 12. For example, the remote display glasses 14a may include a first and a second display 16a, 16b associated with each of the user's eyes, respectively. As such, the photographer can see the image 40 with both eyes. Alternatively, the remote display glasses 14a may include a single display 16 configured to be viewed by both eyes. According to another embodiment, the remote display glasses 14a may include one display 16a configured to be viewed with one eye and an optical lens configured to allow all or a portion of light to pass through to the user's other eye.

According to one embodiment, the remote display glasses 14a optionally includes at least one local camera 58 coupled to the frame 50. The local camera 58 may be configured to allow the photographer to view his surrounding (in real time) in one or more of the displays 16a, 16b while wearing the remote display glasses 14a. As a result, the photographer may see his surroundings without having to remove the remote display glasses 14a. Additionally, the photographer may view his surrounding without having to use the camera 12. While it is possible for a photographer to view his surrounding using the Live View mode of the camera 12, the photographer must focus the camera 12 on the surroundings rather than an object of interest. Additionally, the photographer may become disorientated when trying to view the surroundings using the Live View mode of the camera 12.

The local camera 68 may include any camera configured to generate a video image/stream. The local camera 58 may be secured (either permanently or removably) to a portion of the frame 50, for example, to one or more of the temples 56a, 56b, the nose bridge 60. The remote display glasses 14a may also include a switch 62 configured to allow the photographer to select an image from either the local camera 58 or the peripheral connector 52 (e.g., from the camera 12) to be displayed on the displays 16a, 16b. The switch 62 may include Universal Serial Bus (USB) switch such as, but not limited to, a FSUSB42 switch which is commercially available from Fairchild Semiconductor.

The remote view glasses 14a may optionally include one or more input devices 64(1)-(n). The input devices 64(1)-(n) may be configured to allow the photographer to control various features of the remote display glasses 14a and/or the camera 12. For example, the input devices 64(1)-(n) may be used to control the switch 62 in order to select the video image from either the peripheral connector 52 or the local camera 58. The input devices 64(1)-(n) may also be used to control various features of the remote display glasses 14a such as, but not limited to, controlling the zoom, focus, and/or exposure of the local camera 58 as well as controlling the brightness, color, resolution, etc. of the displays 16a, 16b, or the like.

According to one embodiment, the remote display glasses 14a may be configured to communicate with the camera 12a (e.g., the peripheral controller 36 of the video circuitry 26a). For example, the peripheral connector 52 of the remote display glasses 14a may be coupled to the peripheral connector 34 of the video circuitry 26a by way of a USB cable. The ID pin of the USB connectors 52, 34 may be used by the remote display glasses 14a to transmit command signals to the peripheral controller 36 (e.g., USB controller) of the video circuitry 26a. The USB controller 36 may then communicate the commands to the video processor 28 and/or other circuitry (not shown) forming part of the camera 12. For illustrative purposes, the photographer (e.g., using input devices 64(1)-(n)) may control exposure compensation, focus, brightness, delay timing, shutter speed, etc. As a result, the photographer may control the operation of the camera 12 without having to look at and/or move the camera 12.

While the remote display glasses 14a may be configured to communicate with the camera 12 using a cable coupled to the peripheral connector 34 (e.g., but not limited to, a USB cable), the remote display glasses 14a may also be configured to communicate with the camera 12 using other communication protocols including, but not limited, wireless communication. Examples of wireless communication include short range communication such as, but not limited to, near field communication (NFC), Bluetooth, ultra-wideband (UWB), and the like. The remote display glasses 14a may therefore include a wireless transceiver. The wireless transceiver may be removably connected to the peripheral connector 52. Alternatively, the wireless transceiver may be integrated into the circuitry of the remote display glasses 14a.

The remote display glasses 14a may have a dedicated power supply configured to provide power for the remote display glasses 14a. For example, the remote display glasses 14a may have one or more batteries or the like disposed in a battery compartment 66. The battery compartment 66 may be integrated into the frame 50 of the remote display glasses 14a, or may be removably coupled thereto.

Alternatively, power for the remote display glasses 14a may be provided by the power source associated with the camera 12 (not shown). For example, VBUS pin of the USB connectors 52, 34 may be used to provide power to the remote display glasses 14a. Using the power source of the camera 12 to power the remote display glasses 14a reduces the size and weight of the remote display glasses 14a compared to having a separate power supply for the remote display glasses 14a. Reducing the size and/or weight of the remote display glasses 14a is particular beneficial since the remote display glasses 14a are worn on the photographer's head.

The terms "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit.

According to one aspect, the present disclosure features a system including a digital camera configured to generate an image and remote display glasses. The remote display glasses include a frame, at least one display, and a first and a second temple configured to support the display proximate to at least one of the user's eyes when the remote display glasses are worn on the user's head. The remote display glasses are also configured to receive the image from the digital camera and display the image on the display.

According to another aspect, the present disclosure features a system including remote display glasses and a digital camera. The remote display glasses include a frame, at least one display, and a first and a second temple configured to support the display proximate to at least one of the user's eyes when the remote display glasses are worn on the user's head. The digital camera includes an optical viewfinder, an electronic viewfinder, a video processor configured to generate an image, and a camera switch configured to selectively transmit the image from the video processor to the electronic viewfinder or the display of the remote display glasses.

According to yet another aspect, the present disclosure features a method. The method includes wearing a pair of remote display glasses on a user's face, the remote display glasses comprising a frame, at least one display, and a first and a second temple configured to support the display proximate to at least one of the user's eyes when the remote display glasses are worn on the user's head; generating an image using a video processor of a digital camera, the digital camera further comprising an optical viewfinder and an electronic viewfinder; and selectively transmitting the image to the electronic viewfinder or the display of a remote display glasses.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system comprising:
    a digital camera configured to generate an image; and
    remote display glasses comprising a frame, at least one display, and a first and a second temple configured to support said display proximate to at least one of said user's eyes when said remote display glasses are worn on said user's head, wherein said remote display glasses are configured to receive said image from said digital camera and display said image on said display,
    wherein said digital camera comprises a peripheral switch configured to allow data to be transmitted between a peripheral connector and either a video processor or a peripheral controller.

2. The system of claim 1, wherein said digital camera comprises:
    said video processor configured to generate said image;
    an electronic viewfinder configured to display said image generated by said video processor;
    said peripheral connector configured to be coupled to said remote display glasses; and
    a camera switch, said camera switch configured to selectively transmit said image from said video processor to said electronic viewfinder or said peripheral connector.

3. The system of claim 2, wherein said digital camera further comprises said peripheral controller coupled to said peripheral connector, said peripheral controller configured to establish communication between said peripheral connector and said video processor.

4. The system of claim 1, wherein said peripheral connector includes a universal serial bus (USB) connector and wherein said peripheral controller includes a USB controller.

5. The system of claim 4, wherein said digital camera further comprises a serializer/deserializer configured to convert data between serial data and parallel data formats.

6. The system of claim 2, wherein said remote display glasses further comprises a first and a second display configured to be disposed proximate to a first and a second of said user's eyes, respectively, when said remote display glasses are worn on said user's head.

7. The system of claim 2, wherein said remote display glasses further comprises a local camera coupled to said frame, said local camera configured to allow said user to see a video of the surroundings in said display while wearing said remote display glasses.

8. The system of claim 7, wherein said remote display glasses further comprises a switch configured to allow said user to select an image from either said local camera or from said digital camera for viewing on said display of said remote display glasses.

9. The system of claim 3, wherein said remote display glasses is configured to transmit control signals to said peripheral controller of said digital camera, said control signals configured to control a function of said digital camera.

10. The system of claim 9, wherein said remote display glasses further comprises a peripheral controller configured to be coupled to said peripheral connector of said digital camera.

11. The system of claim 10, wherein said peripheral connectors of said digital camera and said remote display glasses include universal serial bus (USB) connectors coupled to each other using a USB cable, and wherein said remote display glasses is configured to transmit control signals across an ID pin of said USB cable.

12. The system of claim 11, wherein said remote display glasses is configured to receive power from said digital camera across an VBUS pin of said USB cable.

13. A system comprising:
    remote display glasses comprising a frame, at least one display, and a first and a second temple configured to support said display proximate to at least one of said user's eyes when said remote display glasses are worn on said user's head; and
    a digital camera comprising:
        an electronic viewfinder;
        a video processor configured to generate an image; and
        a camera switch configured to selectively transmit said image from said video processor to said electronic viewfinder or said display of said remote display glasses, wherein said remote display glasses further comprises:
        a local camera coupled to said frame, said local camera configured to allow said user to see a video of the surroundings in said display while wearing said remote display glasses; and
        a switch configured to allow said user to select an image from either said local camera or from said digital camera for viewing on said display of said remote display glasses.

14. The system of claim 13, wherein said digital camera further comprises a peripheral controller configured to establish communication between said digital camera and said remote display glasses; and
    wherein said remote display glasses is configured to transmit control signals to said peripheral controller of said digital camera, said control signals configured to control a function of said digital camera.

15. A method comprising:
    wearing a pair of remote display glasses on a user's face, said remote display glasses comprising a frame, at least one display, and a first and a second temple configured to support said display proximate to at least one of said user's eyes when said remote display glasses are worn on said user's head;
    generating an image using a video processor of a digital camera, said digital camera further comprising an electronic viewfinder;
    selectively transmitting said image to said electronic viewfinder or said display of a remote display glasses;
    selectively displaying a video image in said display of said remote display glasses using a local camera coupled to said frame of said remote display glasses; and transmitting control signals from said remote display glasses to said digital camera, said control signal configured to adjust at least one of control exposure compensation, focus, brightness, delay timing, and shutter speed of said digital camera.

16. The method of claim 15, further comprising providing power for said remote display glasses from said digital camera across a cable coupling said digital camera to said remote display glasses.

* * * * *